United States Patent
Li et al.

(10) Patent No.: US 12,071,579 B1
(45) Date of Patent: Aug. 27, 2024

(54) CARBON-BASED MICROORGANISM ELECTRONIC DIVERTER MATERIAL AND PREPARATION METHOD AND USE THEREOF

(71) Applicant: Institute of Eco-environmental and Soil Sciences, Guangdong Academy of Sciences, Guangzhou (CN)

(72) Inventors: Fangbai Li, Guangzhou (CN); Liping Fang, Guangzhou (CN); Kai Liu, Guangzhou (CN)

(73) Assignee: Institute of Eco-environmental and Soil Sciences, Guangdong Academy of Sciences, Guangzhou (CN)

( * ) Notice: Subject to any disclaimer, the term of this patent is extended or adjusted under 35 U.S.C. 154(b) by 0 days.

(21) Appl. No.: 18/526,204

(22) Filed: Dec. 1, 2023

(30) Foreign Application Priority Data

Apr. 21, 2023 (CN) .......................... 202310440432.3

(51) Int. Cl.
*C09K 17/14* (2006.01)
*B09C 1/08* (2006.01)
*B09C 1/10* (2006.01)

(52) U.S. Cl.
CPC ................ *C09K 17/14* (2013.01); *B09C 1/08* (2013.01); *B09C 1/10* (2013.01); *B09C 2101/00* (2013.01)

(58) Field of Classification Search
None
See application file for complete search history.

(56) References Cited

U.S. PATENT DOCUMENTS

| | | |
|---|---|---|
| 2006/0223160 A1 | 10/2006 | Vanzin |
| 2012/0045284 A1 | 2/2012 | Kim et al. |
| 2013/0008801 A1 | 1/2013 | Gu |
| 2017/0282229 A1 | 10/2017 | Li et al. |
| 2022/0340462 A1 | 10/2022 | Wu et al. |

FOREIGN PATENT DOCUMENTS

| | | |
|---|---|---|
| CN | 108772418 A | 11/2018 |
| CN | 109622599 A | 4/2019 |
| CN | 111972233 A | 11/2020 |

(Continued)

OTHER PUBLICATIONS

CN 114713625 (Year: 2022).*

(Continued)

*Primary Examiner* — Charles R Nold
(74) *Attorney, Agent, or Firm* — The Webb Law Firm

(57) ABSTRACT

Disclosed are a carbon-based microorganism electronic diverter material and a preparation method and use thereof. The preparation method may include the following steps of (1) bringing a porous carbon material and dopamine to reaction to obtain a dopamine modified porous carbon material; and (2) bringing the dopamine modified porous carbon material and resazurin to reaction to obtain the carbon-based microorganism electronic diverter material. The carbon-based microorganism electronic diverter material prepared by the disclosure has a capability of storing charges, and is capable of intercepting electrons in a microorganism-driven reduction process of dissimilatory arsenic and iron, and remarkably reducing arsenic reduction and release in a rice field flooding process.

14 Claims, 3 Drawing Sheets

Specification includes a Sequence Listing.

(56) References Cited

FOREIGN PATENT DOCUMENTS

| | | |
|---|---|---|
| CN | 113070028 A | 7/2021 |
| CN | 114713625 A | 7/2022 |
| JP | 2023158621 A | 10/2023 |
| KR | 20210063925 A | 6/2021 |

OTHER PUBLICATIONS

Yunbin et al. "Isolation of a soil electrogenic bacterium Clostridium sporogenes and its electricity-producing performance", Acta Microbiologica Sinica, 2016, 56(5): pp. 846-855. (English-language abstract).
First Office Action for CN202310440432.3.
Notification to Grant Patent Right for Invention for CN202310440432.3.

* cited by examiner

CARBON-BASED MICROORGANISM ELECTRONIC DIVERTER MATERIAL AND PREPARATION METHOD AND USE THEREOF

CROSS-REFERENCE TO RELATED APPLICATION

This application claims priority to Chinese Patent Application No. 202310440432.3 filed Apr. 21, 2023, the disclosure of which is hereby incorporated by reference in its entirety.

INCORPORATION BY REFERENCE

This application includes a sequence listing in computer readable form (a "xml" file) that is submitted herewith on XML file named P23GZ1NW00207US_sequence_list.xml, created on Nov. 15, 2023 and 4,731 bytes in size. This sequence listing is incorporated by reference herein.

BACKGROUND

1. Technical Field

The present disclosure belongs to the technical field of electronic materials, and particularly relates to a carbon-based microorganism electronic diverter material and a preparation method and use thereof.

2. Technical Considerations

Rice is the largest grain crop in China, and paddy soil is a valuable natural resource. However, in recent years, the paddy soil is severely polluted by heavy metals, which seriously damages the production and safety of agricultural products, thus threatening the human health. Although arsenic (As) has not the largest pollution area ratio, it has a high risk to ecosystem and human beings due to its strong toxicity (primary carcinogens), which has attracted much attention. In addition, paddy field is also a main component of terrestrial wetlands, and is a source of greenhouse gas emissions that cannot be ignored. It is reported that methane emitted from rice fields accounts for 15% to 20% of the total emissions every year in the world, and a warming effect of methane is 28 times that of carbon dioxide. Therefore, how to realize the remediation of arsenic pollution in paddy soil and the reduction of greenhouse gas emission is a major environmental problem that needs to be solved urgently, which is of great significance for ensuring national food safety production and achieving carbon neutrality.

Microorganism-driven reduction and release of dissimilatory arsenic under the condition of paddy field flooding is the main cause of the improvement of arsenic activity. At present, a remediation technology of arsenic pollution in rice field soil is mainly based on in-situ stabilization and removal, such as soil leaching, improved soil imported from other places, and plant extraction method to remove top soil. However, the soil leaching and improved soil imported from other places have a large amount of work for large-scale engineering applications, which leads to the destruction of a physical structure of the top soil and the decline of soil fertility. It is also necessary to add a large number of organic fertilizers to reconstruct the top soil, and the cost is high. The plant extraction method takes a long time, which affects the normal cultivation of soil. The in-situ stabilization technology has attracted more and more attention, because as the technology can adsorb and immobilize the soil arsenic at the end by adding an arsenic passivator, which can reduce the risk of the soil arsenic and realize the production while repairing. However, the arsenic passivator cannot simultaneously reduce the greenhouse gas emissions. For example, the related technologies use zero-valent iron and biochar to prepare an iron-based biochar, which promotes the oxidation, adsorption and immobilization of arsenic in paddy soil and reduces the bioavailability of the soil arsenic. There are also patent literatures of related technologies that use peat, reducing iron powder and/or ferrous salt to realize the synchronous passivation of cadmium and arsenic in paddy soil. However, on one hand, the above technologies do not take into account the reduction of greenhouse gas emission. On the other hand, there are studies found that zero-valent iron as an electron donor can promote the methane generation of microorganism. Peat, as a substrate for methanogenic microorganisms, can also promote the methane generation. In addition, in view of greenhouse gas emission reduction in paddy fields, patent application No. CN202010690911.7 proposes a technology to reduce greenhouse gas emission by adding biochar and wood vinegar into paddy fields. However, it is found that a surface of the biochar is negatively charged, which is not conducive to the passivation of metalloid arsenic. Therefore, these technologies are not suitable for the simultaneous realization of arsenic pollution remediation in paddy soil and greenhouse gas emission reduction.

In conclusion, how to effectively reduce the risk of arsenic pollution in paddy soil and realize the multi-objective coordinated management of greenhouse gas emission reduction in paddy field remains an important technical challenge at present.

SUMMARY

The present disclosure aims at solving at least one of the above-mentioned technical problems in the prior art. In view of this, it is an objective of the present disclosure to provide a carbon-based microorganism electronic diverter material having a recyclable charging and discharging function, a preparation method and use thereof. The carbon-based microorganism electronic diverter material prepared by the disclosure has a capability of storing charges and is capable of intercepting electrons in a microorganism-driven reduction process of dissimilatory arsenic and iron, and remarkably reducing arsenic reduction and release in a rice field flooding process, so as to decrease a biological activity of soil arsenic, reduce an absorption of the arsenic by rice, and intercept an electron transfer between exoelectrogenic microorganisms and methanogenic microorganisms in a methanogenic process, thereby effectively inhibiting an emission of methane in paddy soil, and finally, synchronously realizing the purposes of reducing an arsenic activity of the paddy soil and reducing the emission of greenhouse gas.

In order to achieve the above objectives, the technical solutions adopted by the present disclosure are as follows:

According to a first aspect of the present disclosure, provided is a preparation method of a carbon-based microorganism electronic diverter material, comprising the following steps:

(1) bringing a porous carbon material and dopamine to reaction to obtain a dopamine modified porous carbon material; and (2) bringing the dopamine modified porous carbon material and resazurin to reaction to obtain the carbon-based microorganism electronic diverter material.

In some embodiments of the present disclosure, a mass ratio of the porous carbon material to the resazurin is 20:1 to 5.

In some embodiments of the present disclosure, the mass ratio of the porous carbon material to the resazurin is 10:1.

In some embodiments of the present disclosure, a molar concentration ratio of the dopamine to the resazurin is 10:1 to 5.

In some embodiments of the present disclosure, the molar concentration ratio of the dopamine to the resazurin is 5:1.

In some embodiments of the present disclosure, in the step (1), a time for the reaction is 1 hour to 3 hours.

In some embodiments of the present disclosure, in the step (1), the reaction is carried out at a temperature of 25° C.

In some embodiments of the present disclosure, in the step (2), a time for the reaction is 0.5 hours to 3 hours.

In some embodiments of the present disclosure, in the step (2), the time for the reaction is 1 hour.

In some embodiments of the present disclosure, in the step (2), the reaction is carried out at a temperature of 25° C. to 35° C.

In some embodiments of the present disclosure, the porous carbon material is prepared by a process comprising the following steps:
S1. crushing and drying an animal bone to obtain animal bone meal particles;
S2. heating and pyrolyzing the animal bone meal particles under an inert atmosphere, and cooling to obtain a carbon material; and
S3. soaking the carbon material in an acidic solution for reaction, and post-treating a resulting crude product to obtain the porous carbon material.

In some embodiments of the present disclosure, in the step S1, the animal bone comprises at least one of bovine bone, swine bone, and chicken bone.

In some embodiments of the present disclosure, in the step S2, the animal bone meal particles are heated to 700° C. to 1,100° C.

In some embodiments of the present disclosure, in the step S2, the animal bone meal particles are heated to 900° C.

In some embodiments of the present disclosure, in the step S2, a time for the pyrolyzing is 1 hour to 2 hours.

In some embodiments of the present disclosure, in the step S3, the acidic solution comprises at least one of hydrochloric acid, nitric acid and sulfuric acid.

In some embodiments of the present disclosure, in the step S3, the post-treating involves washing the crude product with water until a pH of the fluid after washing is not changed, and then drying.

According to a second aspect of the present disclosure, provided is a carbon-based microorganism electronic diverter material prepared by the above preparation method.

According to a third aspect of the present disclosure, provided is a use of the carbon-based microorganism electronic diverter material in at least one of (1) and (2):
(1) treatment of soil arsenic; and
(2) reduction of soil methane emission.

According to a fourth aspect of the present disclosure, provided is a method of remediation of soil arsenic contamination, comprising applying the carbon-based microorganism electronic diverter material to paddy soil.

According to a fifth aspect of the present disclosure, provided is a method of reduction of soil methane emission, comprising applying the carbon-based microorganism electronic diverter material to paddy soil.

In some embodiments of the present disclosure, a usage amount of the carbon-based microorganism electronic diverter material is 0.5% to 3% of a mass of the soil.

Compared with the prior art, the present disclosure has the following beneficial effects.

(1) The carbon-based microorganism electronic diverter material of the disclosure has a capability of storing charges, and is capable of intercepting electrons in a microorganism-driven reduction process of dissimilatory arsenic and iron, and remarkably reducing arsenic reduction and release in a rice field flooding process, so as to decrease a biological activity of soil arsenic, reduce an absorption of the arsenic by rice, and intercept an electron transfer between exoelectrogenic microorganisms and methanogenic microorganisms in a methanogenic process, thereby effectively inhibiting an emission of methane in rice soil, and finally, synchronously realizing the purposes of reducing an arsenic activity of the rice soil and reducing emission of greenhouse gas.

(2) The resazurin with electron acceptance capability is grafted onto a surface of the porous carbon material through the dopamine, so that the electron acceptance capability of the surface of the carbon-based microorganism electronic diverter material is effectively enhanced. In view of the arsenic-contaminated rice soil, the carbon-based microorganism electronic diverter material effectively inhibits the reduction and release of arsenic and the emission of methane in rice soil under anaerobic conditions simultaneously.

(3) The preparation method of the carbon-based microorganism electronic diverter material of the present disclosure is simple and has a low preparation cost.

DETAILED DESCRIPTION

Figure 1:
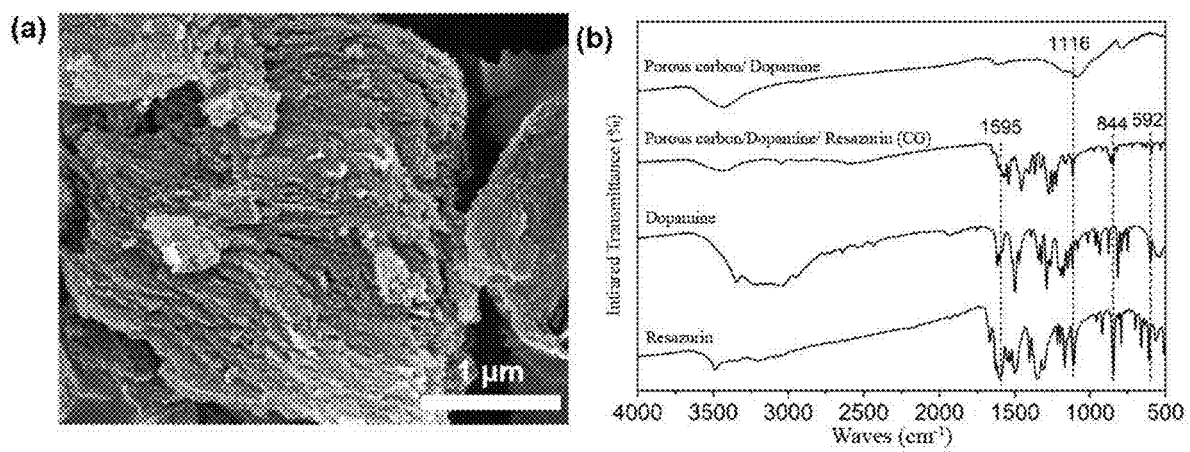
FIG. 1 is a scanning electron microscope graph (A) and an infrared spectrogram (B) of a carbon-based microorganism electronic diverter material CG.

The contents of the present disclosure will be further described in detail below by the specific non-limiting embodiments. Unless specifically specified, the raw materials, reagents or devices used in the following non-limiting embodiments and comparative examples are commercially available from conventional sources or can be obtained by existing methods. Unless specifically specified, the assay or test methods are conventional methods in the art.

Embodiment 1

The embodiment provided a preparation method of a carbon-based microorganism electronic diverter material, which specifically comprised the following steps:

Step 1: crushing bovine bones to obtain powder particles with a particle size less than 2 mm, and then transferring the particles to an oven to dry at 80° C.;

Step 2: transferring the dried powder particles to a vacuum tube furnace, heating to 900° C. under an atmosphere of nitrogen, pyrolyzing for 1 hour, and taking out after cooling to a normal temperature to obtain a carbon material;

Step 3: soaking 3 g of the carbon material obtained in the Step 2 in 50 mL of 2M HCl, shaking for 1 hour, then washing with ultrapure water until a pH of the fluid after washing remained unchanged, and then drying a resulting material in an oven at 80° C. to obtain a porous carbon material; and Step 4: soaking 0.5 g of the porous carbon material in 50 mL of 1 mM dopamine aqueous solution, stirring and reacting for 2 hours at 200 rpm at 25° C., and centrifuging and drying to obtain a dopamine modified porous carbon material (CD); adding the dopamine-modified porous carbon material in 50 ml of 0.2 mM resazurin aqueous solution, stirring at 200 rpm for 1 hour, and centrifugally drying at 25° C. to obtain a carbon-based microorganism electronic diverter material (CG).

In this embodiment, a molar concentration ratio of the dopamine to the resazurin was 5:1.

Embodiment 2

This embodiment provided a carbon-based microorganism electronic diverter material, whose preparation method only differed from that of Embodiment 1 in that the concentration of the resazurin was different:

The 0.2 mM resazurin aqueous solution in Embodiment 1 was replaced by 0.1 mM resazurin aqueous solution, so that a concentration ratio of the dopamine to the resazurin in the system was 10:1. The remaining steps were the same as in Embodiment 1, and a carbon-based microorganism electronic diverter material (CG1) was obtained.

Embodiment 3

This embodiment provided a carbon-based microorganism electronic diverter material, whose preparation method only differed from that of Embodiment 1 in that the concentration of the resazurin was different:

The 0.2 mM resazurin aqueous solution in Embodiment 1 was replaced by 0.5 mM resazurin aqueous solution, so that a concentration ratio of the dopamine to the resazurin in the system was 2:1. CG1 remaining steps were the same as in Embodiment 1, and a carbon-based microorganism electronic diverter material (CG2) was obtained.

Performance Test

Test 1

A structure of the carbon-based microorganism electronic diverter material CG prepared in Embodiment 1 was tested, and the test methods were performed as follows.

Scanning electron microscope test: placing the prepared powder carbon-based microorganism electronic diverter material CG on a scanning electron microscope sample stage for scanning electron microscope test.

Infrared spectrum test: mixing, grounding and tableting the prepared carbon-based microorganism electronic diverter material CG with potassium bromide in a mass ratio of 1:100 into a sample, and testing the sample by using a Fourier infrared spectrometer.

As shown in FIG. 1, it can be seen from the scanning electron microscope graph that the carbon-based microorganism electronic diverter material CG prepared in Embodiment 1 has an obvious porous structure. Further in combination with the infrared spectrum analysis, it shows that the CG modified by the dopamine and the resazurin has distinct incurvated vibration peaks at 1,595 cm-1, 1,116 cm-1, 844 cm-1 and 592 cm-1, and these characteristic peaks are mainly derived from the vibration peaks of the dopamine or the resazurin. The results show that the resazurin is successfully grafted to the surface of the porous carbon, so that the electron acceptance capability of the CG can be improved.

The materials in Embodiments 2 and 3 were tested with the same way, and it was found that the technical effects were similar to that of Embodiment 1.

Test 2

Electrochemical properties of the carbon-based microorganism electronic diverter material CG prepared in Embodiment 1 and a biochar were tested, and the test methods were performed as follows.

Preparation of a comparison material biochar: placing dried rice straws to a vacuum tube furnace, heating to 500° C. under an atmosphere of nitrogen, pyrolyzing for 1 hour, and taking out after cooling to a normal temperature to obtain the biochar.

The carbon-based microorganism electronic diverter material CG (5 mg) prepared in Embodiment 1 and the biochar (5 mg) were respectively placed in 0.5 mL of 0.05% Wt Nafion alcohol solution, and subjected to ultrasonic treatment for 10 minutes to obtain dispersed mixed solutions respectively. 10 μL of the above dispersed solutions were respectively drawn and dripped on activated glassy carbon working electrodes, and used for electrochemical test after air drying.

Cyclic Voltammetry (CV) test was carried out, wherein 0.1 mol/L KCl was used for the CV test as an electrolyte solution, a potential window was −0.6 V to 0.4 V, and a scanning speed was 0.02 V/s.

Constant current charging and discharging test was carried out, wherein 0.1 mol/L KCl was used for the constant current charging and discharging test as an electrolyte solution, and a constant current was 0.0001 A. The test was cycled for 5 times.

Figure 2:
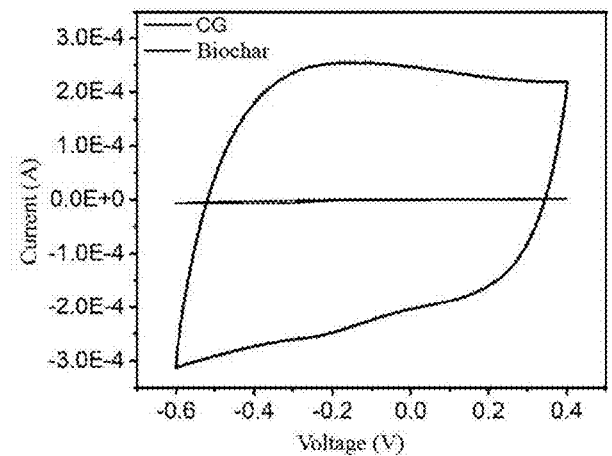
FIG. 2 is a cyclic voltammetry test diagram of the carbon-based microorganism electronic diverter material CG and a biochar.
Figure 3:
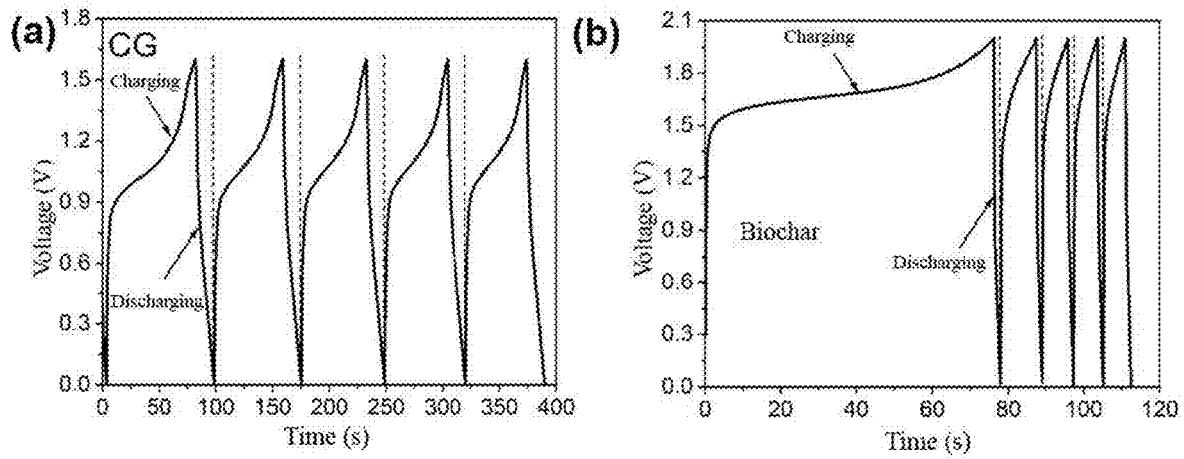
FIG. 3 is a constant current charging and discharging diagram of the carbon-based microorganism electronic diverter material CG and the biochar.

It can be seen from FIG. 2 that a CV curve of the carbon-based microorganism electronic diverter material CG tends to be rectangular, showing obvious electric double layer capacitance properties, and an area of the CV curve of the CG is obviously larger than that of the biochar, indicating that a specific capacitance of the carbon-based microorganism electronic diverter material is larger, which is 196.17 F/g. In addition, it can be seen from FIG. 3 that the charging and discharging curves of the carbon-based microorganism electronic diverter material CG are stable among five cycles, indicating that the carbon-based microorganism electronic diverter material CG has a stable charging and discharging property for a supercapacitor. In contrast, with the increase of charging and discharging cycles, a charging time of the biochar becomes shorter and shorter, and a capacitance property is unstable. Therefore, the carbon-based microorganism electronic diverter material CG prepared in the embodiment of the present disclosure has a high specific capacitance and a stable charging and discharging property.

The materials in Embodiments 2 and 3 were tested with the same way, and it was found that the technical effects were similar to that of Embodiment 1.

Test 3

Electronic exchange abilities of the prepared CD, CG, CG1, CG2 and the comparison material biochar prepared in the performance test 2 were tested by using an electrochemical workstation. The test methods were performed as follows.

For the measurement of the electron acceptance capability (EAC) and electron donating capability (EDC) of the carbon-based materials, potentials of electrochemical working electrodes were set to −0.49 V and +0.61 V respectively. Zwitterionic viologen 4,4'-bipyridinium-1,1'-bis(2-ethylsulfonate) (ZiV) and 2,2'-azino-bis(3-ethylbenzothiazoline-6-sulfonic acid) diammonium salt (ABTS) were selected as an electron transfer media. The working electrodes were placed in 30 mL of electrolyte (0.1M KCl; 0.1M phosphate buffer, pH 7). When the background current response was stable, 1 mL of ZiV or ABTS solution (10 mM) was added to the electrolyte. After the background current was constant, 0.2 mL of 10 g/L CG suspension was added to the electrolyte to monitor current change.

Figure 4:
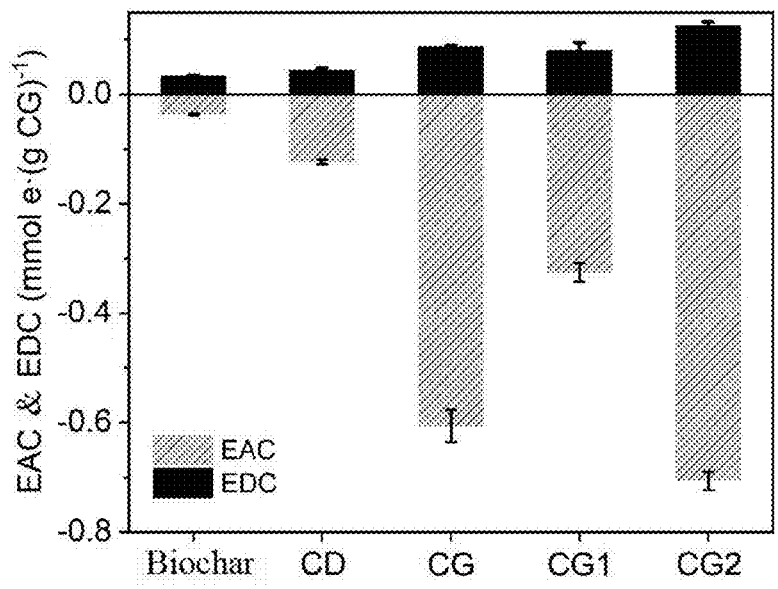
FIG. 4 is an electronic exchange capacity diagram of the biochar, a CD, and carbon-based microorganism electronic diverter materials (CG, CG1, CG2)

It can be seen from FIG. 4 that the EACs of the prepared CG, CG1 and CG2 were obviously higher than the EDCs, indicating that the CG materials are more likely to receive electrons and store the received electrons. With the increase of a concentration ratio of the resazurin to the dopamine, the EAC increases. Compared with the biochar, the EACs and the EDCs of CG, CG1 and CG2 are obviously higher than that of the biochar and the CD, showing a better electronic exchange capability.

Test 4

Inhibition of arsenic release by the carbon-based microorganism electronic diverter material inhibited was tested, and the specific test steps were performed as follows.

The CG prepared in Embodiment 1 and the biochar were tested by means of microculture microcosm experiment respectively. 30 mL of 2 mM ferrihydrite suspension adsorbed with arsenic was added to a 50 mL penicillin bottle which contained an iron reduction microorganism (Shewanella onidensis MR-1) with an OD value of 0.2, 100 mM lactic acid, 0.2 g/L of ferrihydrite, 5 mM piperazine-1,4-bisethanesulfonic acid (PIPES), and a pH was adjusted to 7±0.2. Then, an equal amount of CG or biochar was added respectively, so that a final concentration of the materials in the system was 50 mg/L. The system was aerated with nitrogen for 1 hour to fully remove oxygen in the system and then capped. The system was cultured in an incubator with a constant temperature of 30° C., and samples were taken out at different time periods along with the reaction, to analyze the concentrations of water-soluble Fe (II) and As (III). The results were shown in FIG. 5.

Figure 5:
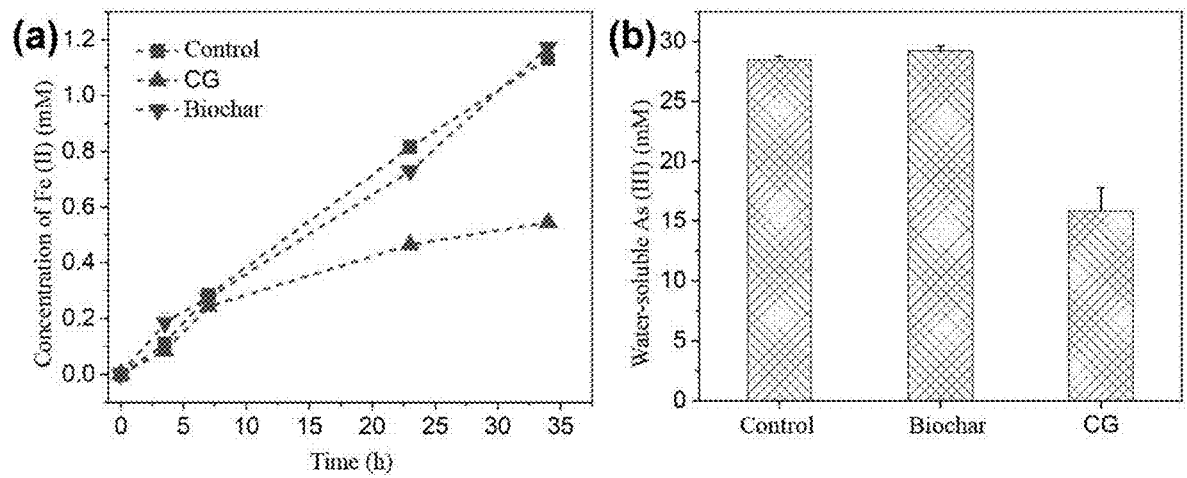
FIG. 5 is a concentration change of water-soluble Fe (II) (a) and a concentration change of water-soluble As (III) (b) in an iron reduction process driven by MR-1 under the treatment by biochar and CG.

According to FIG. 5, in panel (a), the system with the biochar treatment has a similar Fe (II) concentration change as the control treatment system without the carbon-based microorganism electronic diverter material, indicating that the biochar treatment has no effect on microorganism-driven dissimilatory iron reduction. However, the Fe (II) concentration in the CG treatment system is obviously lower than that in the control or biochar treatment system, which indicates the inhibition of the microorganism-driven dissimilatory iron reduction. In addition, the water-soluble As (III) in the systems was determined. The results of panel (b) in FIG. 5 shows that the water-soluble As (III) in the biochar treatment system is slightly higher than that in the control treatment system, while the release of As (III) in the CG treatment system is obviously inhibited, which is 44% lower than that in the control system. The reason is that extracellular electrons are intercepted by the CG during the dissimilatory iron reduction process, which inhibits the reduction and dissolution of ferrihydrite, thus reducing the release of adsorbed As (III).

The materials in Embodiments 2 and 3 were tested with the same way, and it was found that the technical effects were similar to that of Embodiment 1.

Test 5

Effects of the carbon-based microorganism electronic diverter material on regulating arsenic conversion and reducing methane emission were evaluated, and the specific steps were performed as follows.

The CG prepared in Embodiment 1 and the biochar were respectively subjected to a soil anaerobic culture microcosm experiment. 5 g of dry arsenic-contaminated rice soil collected from a certain place in Hunan Province was put into 50 mL penicillin bottles, respectively added with 100 mg of the CG or biochar, and then added with 25 m of deionized water. The soil suspension was put into an anaerobic glove box for oxygen removal, and after the oxygen removal was completed, the anaerobic culture experiment was started for 25 days. After 25 days of culture, methane concentrations were measured by collecting gas from the anaerobic culture bottles respectively. In addition, supernatants were obtained by centrifugation of the soil suspensions, and concentrations of the water-soluble As (III) were measured respectively. The results were shown in FIG. 6.

Figure 6:
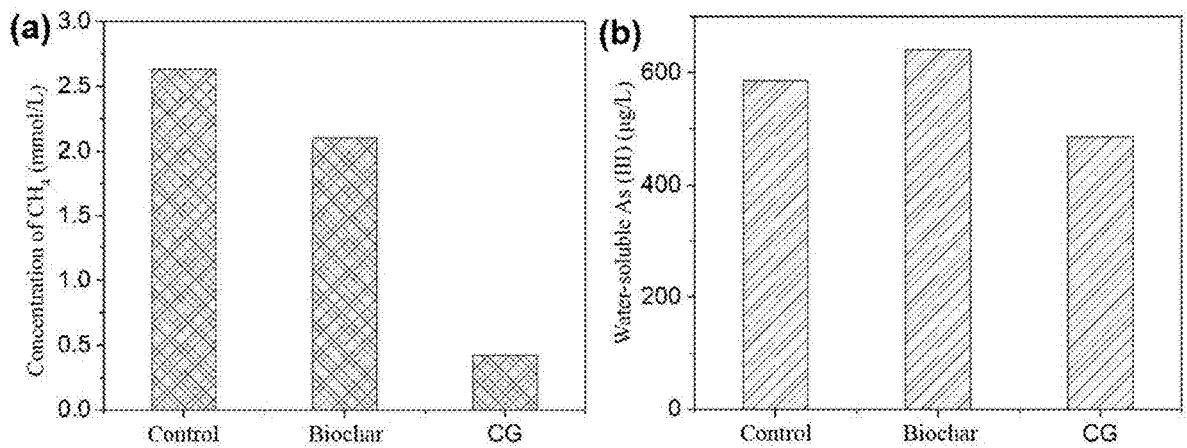
FIG. 6 is an emission concentration of soil methane (a) and a concentration of the water-soluble As (III) (b) under the treatment by biochar and CG.

As can be seen from FIG. 6, the methane concentration in the control treatment group without the carbon-based microorganism electronic diverter material reaches 2.63 mmol/L, and the methane concentration in the biochar treatment group is slightly reduced, while the methane concentration in the CG treatment group is obviously reduced, which is 84% and 80% respectively lower than those in the control and biochar treatment groups. It indicates that the CG can obviously reduce methane emission from soil. Meanwhile, the concentration of the water-soluble As (III) in the soil suspension was determined. The results show that the CG can also significantly reduce the release of arsenic from soil, while the biochar slightly promotes the release of arsenic. Therefore, the carbon-based microorganism electronic diverter material can simultaneously inhibit arsenic release from soil and reduce methane emission.

The materials in Embodiments 2 and 3 were tested with the same way, and it was found that the technical effects were similar to that of Embodiment 1.

Test 6

Gene expression of soil microorganism regulated by the carbon-based microorganism electronic diverter material was evaluated, and the specific steps were performed as follows.

Total soil DNA (as a DNA template) was extracted by using a QIamp PowerSoil Pro DNA Kit. Specifically, 0.35 g of wet soil after the anaerobic microcosm culture was taken, and soil DNA was extracted by adding a DNA extraction reagent. A gene for arsenic reduction function, arrA, and a gene for methanogenic function, mcrA, in different DNA samples were absolutely quantified by using a fluorescence quantitative PCR. Amplification primers for arsenic reduction functional gene were arrA-CVF/arrA-CVR, and an amplified fragment obtained by amplification has a length of about 330 bp. Amplification primers for methanogenic functional gene mcrA were mcrA-F/mcrA-R, and an amplified fragment obtained by amplification has a length of about 470 bp.

The PCR amplification is qPCR, and a qPCR amplification system used was shown in Table 1:

TABLE 1 qPCR amplification system

| Component | Content |
| --- | --- |
| TB Green Premix Ex Taq II (TliRNaseH Plus) | 20 μL |
| DNA template | 0.8 μL |
| 10 μM forward primer (F) | 0.8 μL |
| 10 μM reverse primer (R) | 0.8 μL |
| Sterile water | 17.6 μL |
| Total volume | 40 μL |

A pUC19 vector was linked to the PCR amplification product of the arrA or mcrA gene, plasmid DNA was extracted after selecting and picking up positive monoclon, a DNA concentration was determined by using Qubits 3.0 Fluorometer, a gene copy number was calculated, and then it was diluted with an EASY dilution diluent to a standard curve of $10^2$ to $10^8$ copy number per μL. The primers for the arrA or mcrA gene were shown as follows:

Forward primer arrA-CVF1:5'-CACAGCGC-CATCTGCGCCGA-3' (SEQ ID NO: 1);
Reverse primer arrA-CVR1-5'-CCGACGAACTCCYTGYTCCA-3' (SEQ ID NO: 2);
Forward primer mcrA-F: 5'-GGTGGTGTMGGATT-CACACARTAYGCWACAGC-3' (SEQ ID NO: 3);
Reverse primer mcrA-R: 5'-TTCATTGCRTAGTTWG-GRTAGTT-3' (SEQ ID NO: 4).

arrA amplification reaction procedure: pre-denaturation at 94° C. for 5 minutes; denaturation at 94° C. for 30 seconds, annealing at 60° C. for 1 minute, and extending at 72° C. for 1 minute, for 40 cycles; and mcrA amplification reaction procedure: pre-denaturation at 95° C. for 5 minutes; denaturation at 95° C. for 60 seconds, annealing at 55° C. for 43 seconds, and extending at 72° C. for 1 minute for 35 cycles.

Figure 7:
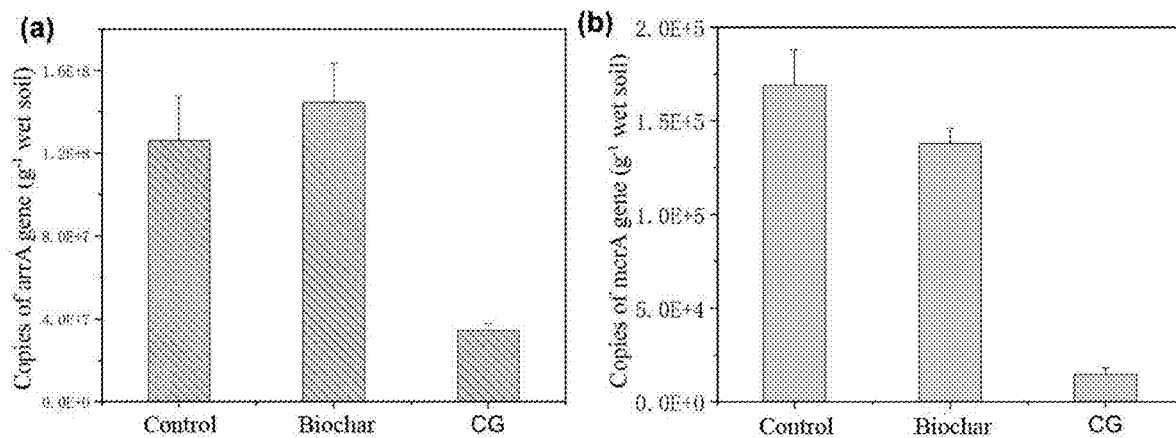
FIG. 7 is a copy number of a gene for soil arsenic reduction function, arrA (a), and a copy number of a gene for methanogenic function, mcrA (b), under the treatment by biochar and CG.

It can be seen from FIG. 7 that the copy numbers of the arsenic reduction functional gene arrA and the methanogenic functional gene mcrA in the soil control group without materials are $1.2\times10^8$ and $1.7\times10^5$ copies/g of wet soil respectively, and the copy number of the arsenic reduction functional gene arrA in the biochar treatment group is slightly increased compared with the control treatment group, and the copy number of the methanogenic functional gene mcrA is slightly decreased, without significant change. While in the CG treatment group, the copy number of the arsenic reduction functional gene arrA and the methanogenic functional gene mcrA are significantly reduced by 64% and 91% respectively, thus simultaneously down-regulating the arsenic reduction functional gene and the methanogenic functional gene.

Figure 8:
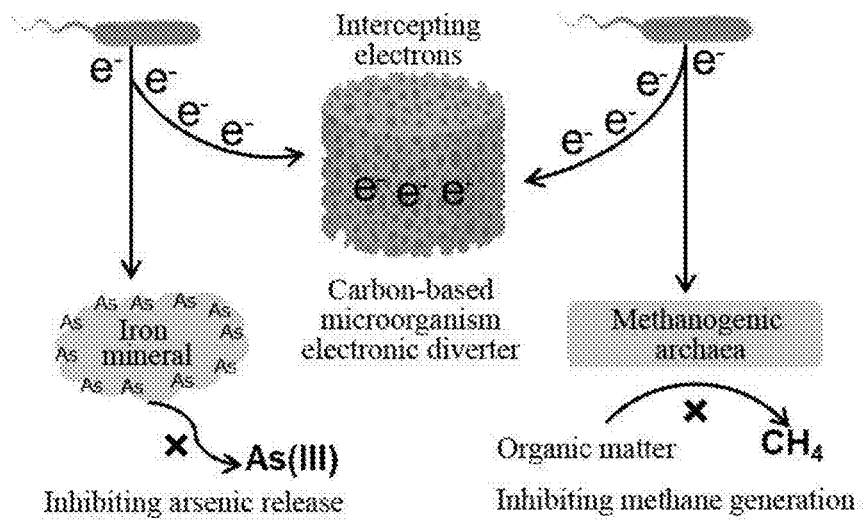
FIG. 8 is a schematic diagram of a principle of inhibiting soil arsenic release and reducing methane emission by the carbon-based microorganism electronic diverter material.

According to the above performance tests, the disclosure further put forward the principle of inhibiting the arsenic release and reducing the methane emission by the carbon-based microorganism electronic diverter material. As shown in FIG. 8, the carbon-based microorganism electronic diverter material has a capability of storing charges, and is capable of intercepting electrons in a microorganism-driven reduction process of dissimilatory arsenic and iron, and intercepting an electron transfer between exoelectrogenic microorganisms and methanogenic microorganisms in a methanogenic process, and synchronously realizing the inhibition of arsenic release and the reduction of methane emission in a rice field flooding process.

The above-mentioned embodiments are the preferred embodiments of the present disclosure, but the embodiments of the present disclosure are not limited by the above-mentioned embodiments, and any other changes, modifications, substitutions, combinations and simplifications made without departing from the spirit and principle of the present disclosure shall be equivalent substitutions, which are all included in the protection scope of the present disclosure.

What is claimed is:

1. A preparation method of a carbon-based microorganism electronic diverter material, comprising the following steps:
  (1) bringing a porous carbon material and dopamine to reaction, to obtain a dopamine modified porous carbon material; and
  (2) bringing the dopamine modified porous carbon material and resazurin to reaction, to obtain the carbon-based microorganism electronic diverter material.

2. The preparation method according to claim 1, wherein a mass ratio of the porous carbon material to the resazurin is 20:1 to 5.

3. The preparation method according to claim 1, wherein a molar concentration of the dopamine to the resazurin is 10:1 to 5.

4. The preparation method according to claim 1, wherein in the step (1), a time for the reaction is 1 hour to 3 hours.

5. The preparation method according to claim 1, wherein in the step (1), the reaction is carried out at a temperature of 25° C.

6. The preparation method according to claim 1, wherein in the step (2), a time for the reaction is 0.5 hour to 3 hours.

7. The preparation method according to claim 1, wherein in the step (2), the reaction is carried out at a temperature of 25° C. to 35° C.

8. A carbon-based microorganism electronic diverter material prepared by the preparation method according to claim 1.

9. A carbon-based microorganism electronic diverter material prepared by the preparation method according to claim 2.

10. A carbon-based microorganism electronic diverter material prepared by the preparation method according to claim 3.

11. A carbon-based microorganism electronic diverter material prepared by the preparation method according to claim 4.

12. A carbon-based microorganism electronic diverter material prepared by the preparation method according to claim 5.

13. A carbon-based microorganism electronic diverter material prepared by the preparation method according to claim 6.

14. A carbon-based microorganism electronic diverter material prepared by the preparation method according to claim 7.

* * * * *

SEQUENCE LISTING

```
Sequence total quantity: 4
SEQ ID NO: 1           moltype = DNA  length = 20
FEATURE                Location/Qualifiers
source                 1..20
                       mol_type = other DNA
                       organism = synthetic construct
SEQUENCE: 1
cacagcgcca tctgcgccga                                               20

SEQ ID NO: 2           moltype = DNA  length = 20
FEATURE                Location/Qualifiers
source                 1..20
                       mol_type = other DNA
                       organism = synthetic construct
SEQUENCE: 2
ccgacgaact ccytgytcca                                               20

SEQ ID NO: 3           moltype = DNA  length = 32
FEATURE                Location/Qualifiers
source                 1..32
                       mol_type = other DNA
                       organism = synthetic construct
SEQUENCE: 3
ggtggtgtmg gattcacaca rtaygcwaca gc                                 32
```

| | |
|---|---|
| SEQ ID NO: 4 | moltype = DNA   length = 23 |
| FEATURE | Location/Qualifiers |
| source | 1..23 |
| | mol_type = other DNA |
| | organism = synthetic construct |
| SEQUENCE: 4 | |
| ttcattgcrt agttwggrta gtt | 23 |